L. K. BENEDICT.
SULKY OR WHEELED COLTER.
APPLICATION FILED DEC. 8, 1916.
1,242,912.
Patented Oct. 16, 1917.
3 SHEETS—SHEET 1.
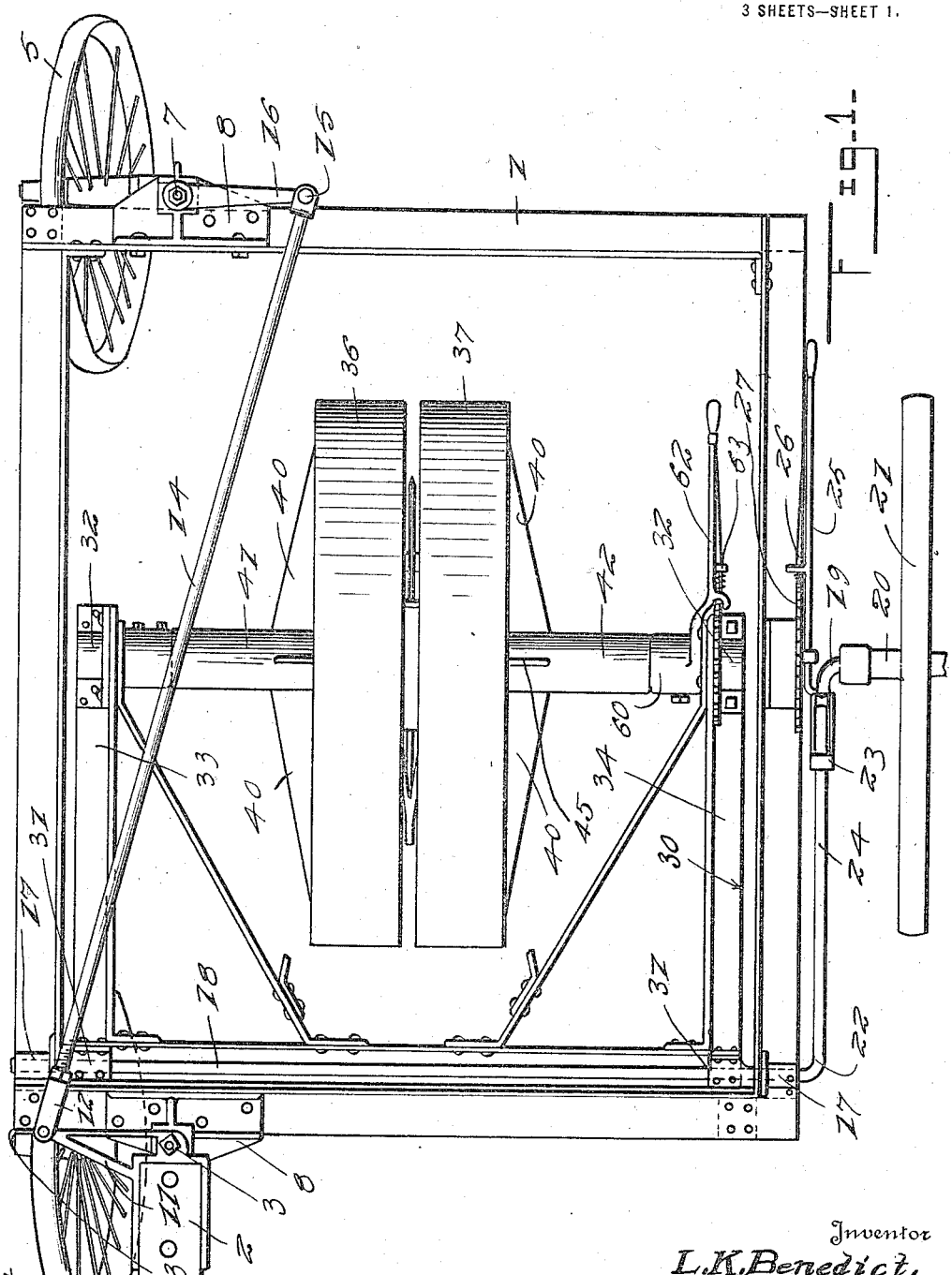
Witnesses
C R Beall
Rob Meyn
Inventor
L. K. Benedict.
By 
Attorney

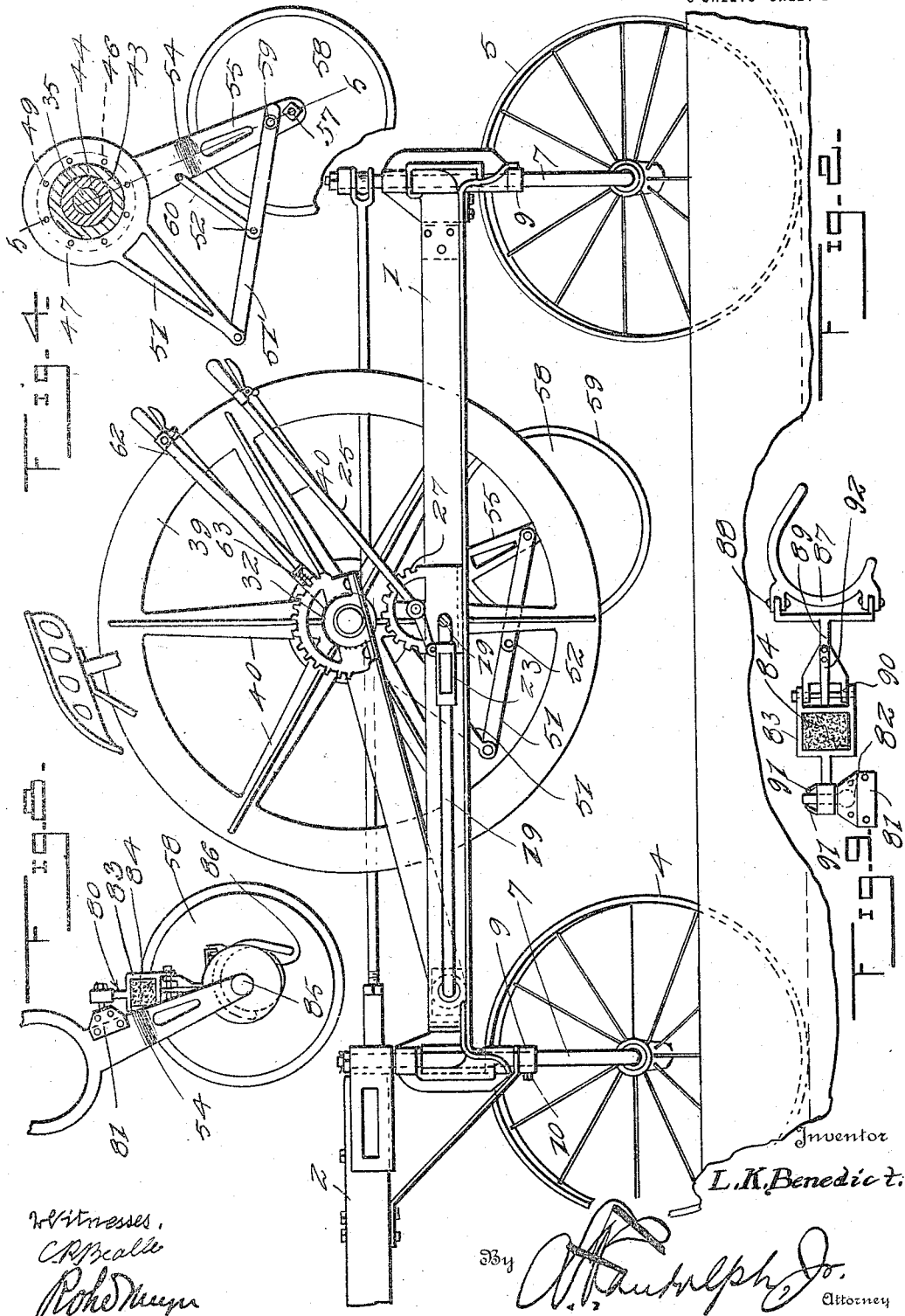

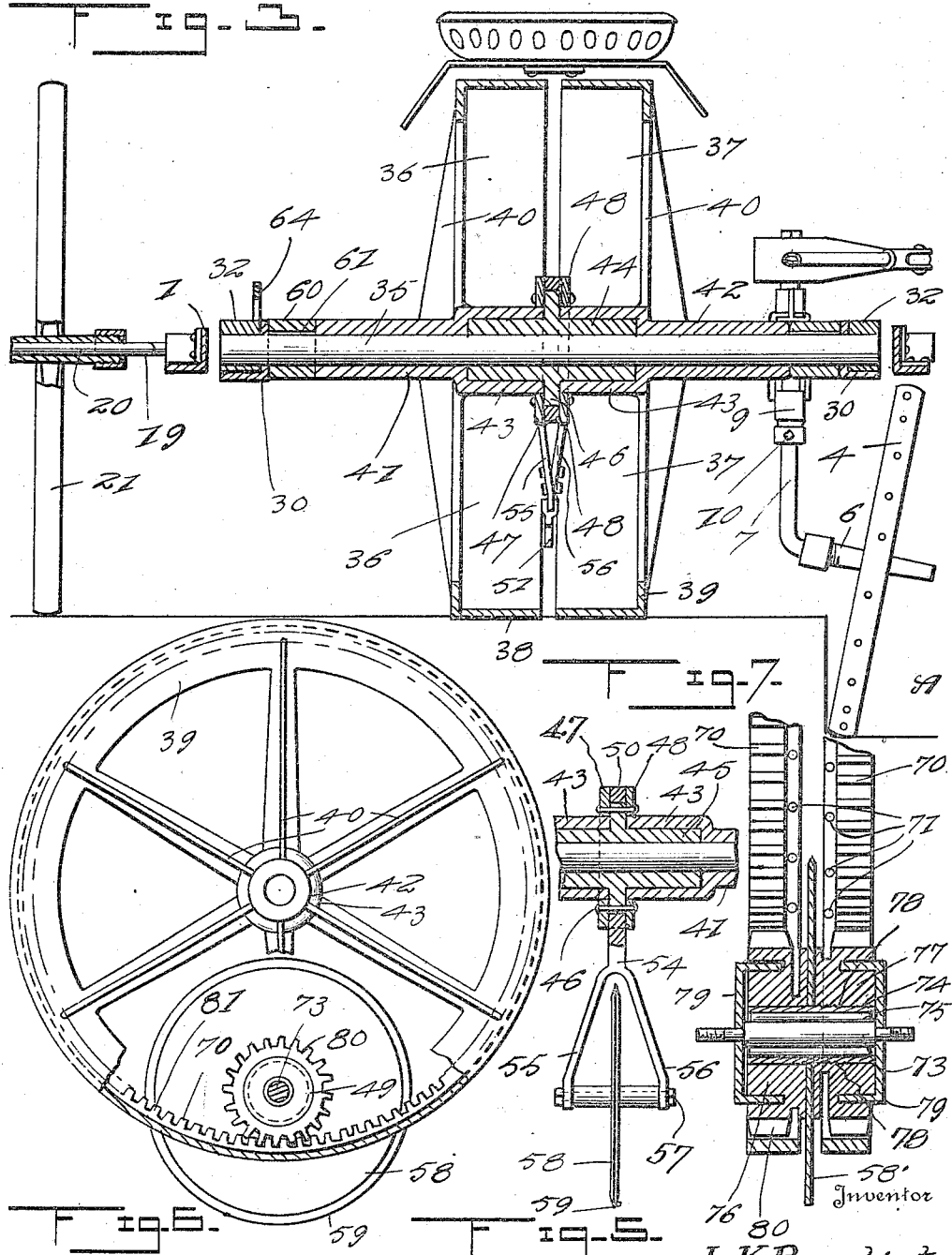

UNITED STATES PATENT OFFICE.

LOUIS K. BENEDICT, OF HASTINGS, FLORIDA.

SULKY OR WHEELED COLTER.

1,242,912.  Specification of Letters Patent.  Patented Oct. 16, 1917.

Application filed December 8, 1916. Serial No. 135,850.

*To all whom it may concern:*

Be it known that I, LOUIS K. BENEDICT, a citizen of the United States, residing at Hastings, in the county of St. John and State of Florida, have invented certain new and useful Improvements in Sulky or Wheeled Colters; and I do hereby declare the following to be a full, clear, and exact description of the invention, such as will enable others skilled in the art to which it appertains to make and use the same.

This invention relates to a wheeled or sulky colter, and the primary object of the invention is to provide a machine for cutting growths of vegetable matter such as crab grass, beggar weed, velvet bean or the like from a field prior to the breaking or plowing of the field.

With this object in view I provide a wheeled or sulky colter which includes a pair of rotary rollers for crushing the vegetable growth and mashing it flat upon the ground, between the facing edges of which rollers is adjustably positioned a rotary colter or cutting blade for cutting through the vegetable growth which has been mashed down by the rollers, so that a breaking plow following the wheeled colter will experience little difficulty in turning the vegetable growth under; I also provide a supporting frame having two wheels adjustably connected thereto at one side of the same, at its forward and rear ends and a second wheel adjustably connected, for vertical adjustment at the center of the opposite side of the frame and to provide a hand lever for vertically adjusting the centrally disposed wheel to provide for adjustment of the frame during the operation of the colter, and I extend the axle upon which the centrally disposed wheel is mounted across the front end of the supporting frame, and to pivotally mount an auxiliary frame upon the extended end of the axle, which auxiliary frame carries the mashing or crushing rollers, the colter and the mechanism for adjusting the elevation of the colter, which frame is loosely mounted for permitting the rollers to pass over obstructions such as roots, rocks or the like. Circular racks are mounted interiorly of the mashing or packing rollers which racks mesh with a pinion operatively connected to the colter wheel for positively driving the colter or cutting disk when the device is traveling over loose or sandy soil and also to provide means whereby the two wheels which are disposed upon the same side of the frame may be steered in unison and by the movement of the tongue of the machine; and a sharpening attachment is also provided for the wheeled colter which is constructed for sharpening the colter during the operation of the machine, and further, a hand lever structure is provided whereby the cutting disk or colter may be moved upwardly out of an operative position for passage over uncuttable articles.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawing wherein like characters designate like and corresponding parts throughout the several views, and in which:—

Figure 1 is a top plan view of the improved wheeled colter with the seat removed.

Fig. 2 is a side elevation of the wheeled colter having parts broken away, the centrally disposed wheel removed and showing the pivoted auxiliary frame in an upper position for illustrating the connection between the pivoted frame and the shaft for supporting the crushing drums or rollers.

Fig. 3 is a vertical section through the center of the machine.

Fig. 4 is a cross section through the machine illustrating the colter or cutting disk and its operating mechanism in side elevation.

Fig. 5 is a section on the line 5—5 of Fig. 4.

Fig. 6 is a side elevation looking inwardly into one of the crushing drums and illustrating a modified form.

Fig. 7 is a section through the modified form illustrated in Fig. 6.

Fig. 8 is a side elevation of the disk sharpening device showing the same applied, and Fig. 9 is a side elevation of the sharpening device showing it removed.

Referring more particularly to the drawings, 1 designates the main supporting frame of the wheeled or sulky colter which has a tongue 2 pivotally connected to the front right hand corner of the same as indicated at 3, to which tongue the draft animals are hitched. The supporting frame 1 has supporting wheels 4 and 5 which are rotatably mounted upon suitable axles 6, carried at the front and rear corners of the right hand side of the same as clearly shown in Fig. 1 of the drawings. The axles 6, are of the usual type employed in sulky plows, and they are bent upwardly. The axles 6 are provided with vertical portions 7, which extend upwardly through brackets 8 carried by the supporting frame 1. The vertical portions of the axle are rotatably mounted in the brackets 8 so as to permit of the steering movement of the wheels and they have collars 9 mounted thereon and held in adjusted positions by means of set screws 10 for limiting the vertical movement of the axles with respect to the frame.

The front axle 6 is connected to the tongue 2 for movement therewith, so that the front supporting wheel 4 may be moved in unison with the movement of the tongue 2. A bracket 11 is connected to the tongue 2 and it has a link 12 pivotally connected thereto as shown at 13, to which link is adjustably connected a rod 14. The rod 14 extends rearwardly across the frame 1 and has its rear end pivotally connected as indicated at 15 to an arm 16 which is connected to the upper end of the vertical portions 7 of the rear axle 6 for steering the rear supporting wheel 5 in unison with the front supporting wheel 4 and the tongue 2.

The supporting frame 1 has suitable bearings 17 carried by its forward end, which bearings rotatably support the horizontally positioned extensions 18 of an axle 19. The axle 19 has a spindle portion 20 formed thereon upon which is mounted a supporting wheel 21. The supporting wheel 21 is positioned at the left side of the frame 1 and substantially equi-distant of the front and rear ends of the frame. The axle 19 extends forwardly along the outer left side of the frame 1 and is bent as shown at 22 to form the horizontally extending portion 18 which extends transversely across the front end of the supporting frame 1.

A sleeve or collar 23 is slidably mounted upon the longitudinally extending portion 24 of the axle 9 and it is connected to a hand lever 25, which hand lever is pivotally supported by the left side of the frame 1 and is provided for adjusting the elevation of the supporting wheel 21, to accommodate uneven places in the field over which the colter is traveling, or to level the supporting frame 1, in cases where the depth of the furrow in which the supporting wheels 4 and 5 are traveling, changes. The lever 25 has a dog mechanism 26 carried thereby which coacts with a quadrant 27, for holding the lever in adjusted position.

An auxiliary frame 30 is provided, which has bearings 31 attached to its front corners, which bearings are mounted upon the horizontal transversely extending portion 18 of the axle 19 for pivotally supporting the auxiliary frame 30. Bearings 32 are carried by the rear end of the side rails 33 and 34 of the auxiliary frame 30, and they rotatably support a shaft or axle 35 upon which is mounted a pair of crushing rollers 36 and 37. The crushing rollers 36 and 37 include rims 38 which have inwardly extending webs 39 formed thereon to which are attached a plurality of spokes 40. The rollers 36 and 37 have their inner facing sides open as clearly shown in Fig. 3 of the drawings and the spokes 40 thereof are connected to the hubs 41 and 42 of the rollers which hubs extend outwardly beyond the outer edges of the rollers for forming elongated bearings between the rollers and the axle 35. The inner portion 43 of the hubs are enlarged, and rotatably mounted upon a collar 44 which is keyed to the shaft or axle 35 by means of a key 45 for rotation with the shaft.

The collar 44 has an annular flange 46 formed thereon equi-distant of its ends to which is attached a pair of rings 47 and 48. The rings 47 and 48 are attached to the annular flange 46 by means of rivets or pins 49 and they are positioned upon each side of a centrally disposed ring 50 which is rotatably mounted above the periphery of the flange 46. The rings 47 and 48 have arms 51 formed thereon and extending outwardly therefrom, to the outer end of which arms is connected an arm 51' which is jointed and connected by a break pin 52. The ring 50 has an outwardly extending arm 54 formed thereon the outer end of which is forked to form spaced arms 55 and 56, the outer ends of which form bearings for a pin 57 upon which is mounted the rotary colter or sharpened disk 58. The disk 58 has its outer end sharpened as shown at 59 for cutting through the vegetable matter which is mashed down by the rollers 36 and 37 and the disk 58 is positioned between the facing sides of the rollers as clearly shown in Fig. 1 of the drawings. The arm 51' is connected to the arm 55 as shown at 59 and it is braced by a suitable bracing arm 60 which is connected to the arm 54 above the fork formed therein and to the arm 51' at the joint by means of the break pin 52 which will allow the disconnection of the bracing arm 60 and the arm 51' and the disconnection of the sections of the arm 51, in case the sharpened disk or colter 58 engages a root under the ground, by the breaking of the break pin which will permit the disk to move upwardly independent of the arms 51 and the rings 47 and 48 for passage over the root, rock or other analogous article which has been engaged by the colter.

A collar 60' is keyed upon the shaft or axle 35 by means of a key 61, and it has a hand lever 62 formed thereon for rotating the collar and consequently the axle or shaft upon oscillatory movement of the hand lever. A dog mechanism 63 is carried by the hand lever 62 for coaction with a quadrant 64 which is carried by the bearing 32 which is mounted upon the side rail 34 as clearly shown in Fig. 1 of the drawings.

When the hand lever 62 is rocked, it will rotate the shaft or axle 35, and consequently rotate the collar 44 which is keyed thereon. The rotation of the collar, will rotate the rings or disks 47 and 48 and move the arms 51 rearwardly, which will through the connection of the arm 51' to the arm 54 raise the arm 60 upwardly for raising the colter or sharpened disk 58 out of an operative position.

In the operation of the improved colter; the colter is driven over a field, which is overgrown with vegetation, such as crab grass, pea vines, velvet beans, beggar weed or the like directly in front of the breaking plow so that the supporting wheels 4 and 5 will travel in the furrow as indicated at A in Fig. 3 of the drawings while the supporting wheel 21 will travel over the unplowed ground. The rollers 36 and 37 are positioned upon the axle 35 so that they will mash down or crush the vegetation on both sides of a line where the shin of the breaking plow will travel and the colter 58, being positioned between the facing sides of the rollers will cut the vegetation between the rollers leaving a free path for the shin of the plow, thereby eliminating the inconveniences caused by tangling of the vines upon an ordinary colter carried by the plow or upon the plow standards, materially facilitating the breaking of the land. The rollers 36 and 37 are provided for crushing or mashing down the vegetation so that it may be cut by the colter 58.

In Figs. 6 and 7 of the drawings, a modified form of the invention is shown, wherein circular racks 70 are mounted within the rims of the drums or rollers 36 and 37 and are attached to the rims in any suitable manner such as by bolts 71 which extend through smooth portions 72 formed on the edges of the circular rack 70.

The pin 73 upon which the disk or colter 58' is mounted has a collar 74 mounted thereon in which is positioned a plurality of bearing rollers 75 which engage the circumference of the pin 73. A pinion section 76 is mounted upon one end of the sleeve 74, being swaged or shrunk thereon and a second pinion section 77 is removably mounted upon the opposite end of the pin, and upon the opposite side of the colter 58' as clearly shown in Fig. 7 of the drawings and held thereon through the medium of screw threads 78. Suitable keys or guard plates 79 are attached to the outer ends of the pinion sections 76 and 77 and engage the outer end of the pin 73 for preventing endwise movement of the pin within the bores of the pinions and within the sleeve 74. The pin 73 has its outer end reduced for being rotatably seated in the arms 55 and 56 of the forked arm 54. The peripheral teeth 80 of the pinion sections mesh with the internal teeth 81 of the circular rack 70 for positively rotating the sharpened disk or colter 58' when the machine is traveling over loose or sandy soil.

In Figs. 8 and 9 of the drawings, a sharpening device is illustrated, which is employed for sharpening the colter 58 during the operation of the same. The sharpener, generally indicated by the numeral 80 includes a bracket 81 which is attached to the arm 54 and has a ball and socket joint 82 formed therein. A casing 83 is connected to the bracket 81 by the ball socket joint 82 and it has carborundum or analogous sharpening material indicated at 84 positioned therein and adapted for engaging the edge of the disk or colter 58. The hub 85 of the colter 58 has an eccentric 86 mounted thereon which is engaged by a curved arm 87 carried by the sharpener. The curved arm 87 is pivotally connected as shown at 88 to an arm 89 which is in turn pivotally connected as shown at 90 to the casing 83, so that during the rotation of the colter, the casing 83 and the sharpening material 84 carried thereby will be moved backward and forward for properly sharpening the edge of the colter. Springs 91 are carried by the bracket 81 and engage the ball and socket joint for forcing the casing 83 and the sharpening stone 84 carried thereby outwardly and holding the arcuate arm 87 in engagement with the eccentric 86 and the action of the springs 91 is facilitated by a central flat spring 92.

From the foregoing description taken in connection with the accompanying drawings, the advantages of construction and of the method of operation of the improved sulky or wheeled colter will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a wheeled colter, a supporting frame, an axle extending across the front end of said supporting frame, and along one side of the supporting frame to a point substantially equi-distant of its ends, a supporting wheel mounted upon the rearmost end of said axle, an auxiliary supporting frame pivotally mounted upon the forward portion of said axle, a shaft carried by said auxiliary supporting frame, a pair of crushing rollers rotatably mounted upon said shaft and having their facing sides spaced, a colter supported by said shaft and positioned between the facing sides of said crushing rollers.

2. In a wheeled colter, a supporting frame, an axle extending across the front end of said supporting frame, and along one side of the supporting frame to a point substantially equi-distant of its ends, a supporting wheel mounted upon the rearmost end of said axle, an auxiliary supporting frame pivotally mounted upon the forward portion of said axle, a shaft carried by said auxiliary supporting frame, a pair of crushing rollers rotatably mounted upon said shaft and having their facing sides spaced, a colter supported by said shaft and positioned between the facing sides of said crushing rollers, and means for raising or lowering the portion of said axle which extends rearwardly, for raising or lowering the supporting wheel carried thereby.

3. In a wheeled colter, a supporting frame, an axle extending across the front end of said supporting frame, and along one side of the supporting frame to a point substantially equi-distant of its ends, a supporting wheel mounted upon the rearmost end of said axle, an auxiliary supporting frame pivotally mounted upon the forward portion of said axle, a shaft carried by said auxiliary supporting frame, a pair of crushing rollers rotatably mounted upon said shaft and having their facing sides spaced, a colter supported by said shaft and positioned between the facing sides of said crushing rollers, means for raising or lowering the portion of said axle which extends rearwardly, for raising or lowering the supporting wheel carried thereby, supporting wheels adjustably carried at the front and rear corners of said supporting frame oppositely to said first named supporting wheel, a tongue pivotally connected to said supporting frame, means connecting said tongue to the front of said last named supporting wheels for steering the wheel in unison with movement of the tongue, and adjustable means connecting said tongue to the rear of said second mentioned supporting wheels for steering said second mentioned supporting wheels in unison.

4. In a wheeled colter, a supporting frame, an auxiliary supporting frame pivotally carried by said supporting frame, a shaft rotatably carried by the rear end of said pivoted frame, a pair of crushing drums rotatably mounted upon said shaft, a collar shrunk upon said shaft intermediate its ends, a pair of rings connected to said collar for rotation therewith, arms connected to said rings, a second ring mounted upon said collar and positioned between said first named rings, a colter carrying arm formed upon said last named ring, and a colter rotatably supported by said last named arm between the facing sides of said drums.

5. In a wheeled colter, a supporting frame, an auxiliary supporting frame pivotally carried by said supporting frame, a shaft rotatably carried by the rear end of said pivoted frame, a pair of crushing drums rotatably mounted upon said shaft, a collar shrunk upon said shaft intermediate its ends, a pair of rings connected to said collar for rotation therewith, arms connected to said rings, a second ring mounted upon said collar and positioned between said first named rings, a colter carrying arm formed upon said last named ring, a colter rotatably supported by said last named arms between the facing sides of said drums, a jointed arm connecting the first named arm to said colter carrying arm, a brace, a break pin connecting said brace to said jointed arm at the point of junction of its sections whereby the breaking of said pin will allow the sections of the jointed arm to be separated for permitting the colter carrying arm to swing upwardly independent of movement of said first mentioned ring, and the arms carried thereby.

6. In a wheeled colter structure, a supporting frame, an axle extending across the front end of said supporting frame and along one side of the frame to a point substantially equi-distant of its ends, a supporting wheel mounted upon the rearmost end of said axle, an auxiliary frame pivotally mounted upon the forward portion of said axle, vegetation crushing means carried by said auxiliary frame, and vegetation cutting means carried by said auxiliary frame and positioned for cutting the crushed vegetation.

7. In a wheeled colter structure, the combination, of a supporting frame, an auxiliary supporting frame pivotally connected to said first named supporting frame, a shaft carried by said auxiliary supporting frame, a pair of crushing drums rotatably mounted upon said shaft, a colter positioned between said drums for cutting the vegetation crushed by the drums, and means connecting said colter and said drums for rotating said colter by the rotation of said drums.

8. In a wheeled colter structure, a supporting frame, an axle extending across the front end of said supporting frame and along one side of the supporting frame to a point substantially equi-distant of its ends, a supporting wheel mounted upon the rearmost end of said axle, an auxiliary supporting frame pivotally mounted upon the forward portion of said axle, a shaft carried by said auxiliary supporting frame, a pair of crushing rollers mounted upon said shaft and having their facing sides spaced, a collar shrunk upon said shaft intermediate its ends, a pair of rings connected to said collar for rotation therewith, arms connected to said rings, a second ring mounted upon said collar and positioned between said first named rings, a colter carrying arm formed upon said last named ring, and a colter rotatably supported by said last named arm between the facing sides of said drums.

9. In a wheeled colter structure, a supporting frame, an axle extending across the front end of said supporting frame and along one side of the same to a point substantially equi-distant of its ends, a supporting wheel mounted upon the rearmost end of said axle, an auxiliary supporting frame pivotally mounted upon the forward portion of said axle, a shaft carried by said auxiliary supporting frame, means for raising or lowering the portion of said axle which extends rearwardly for raising or lowering the supporting wheel carried thereby, supporting wheels adjustably carried at the front and rear corners of said supporting frame oppositely to said first named supporting wheel, a tongue pivotally connected to said supporting frame, means connecting said tongue to the front of said last named supporting wheel for steering the wheels in unison with movement of the tongue, adjustable means connecting said tongue to the rear of said second mentioned supporting wheels for steering said second mentioned supporting wheels in unison, vegetation crushing means carried by said auxiliary frame, and vegetation cutting means carried by said auxiliary frame and positioned for cutting the crushed vegetation.

10. In a wheeled colter structure, a supporting frame, an axle extending across the front end of said supporting frame and along one side of the same to a point substantially equi-distant of its ends, a supporting wheel mounted upon the rearmost end of said axle, an auxiliary supporting frame pivotally mounted upon the forward portion of said axle, a shaft carried by said auxiliary supporting frame, means for raising or lowering the portion of said axle which extends rearwardly for raising or lowering the supporting wheel carried thereby, supporting wheels adjustably carried at the front and rear corners of said supporting frame oppositely to said first named supporting wheel, a tongue pivotally connected to said supporting frame, means connecting said tongue to the front of said last named supporting wheel for steering the wheels in unison with movement of the tongue, adjustable means connecting said tongue to the rear of said second mentioned supporting wheels for steering said second mentioned supporting wheels in unison, vegetation crushing means carried by said auxiliary frame, and vegetation cutting means carried by said auxiliary frame and positioned for cutting the crushed vegetation, means for permitting said vegetation cutting means to move upwardly out of a cutting position upon striking an uncuttable article.

11. In a wheeled colter structure, the combination, of a supporting frame, an auxiliary supporting frame pivotally connected to said supporting frame, vegetation crushing means carried by said auxiliary supporting frame, vegetation cutting means carried by said auxiliary frame and positioned for cutting the crushed vegetation, and means connected to said vegetation cutting means for permitting said means to move out of a cutting position upon engagement with an uncuttable article.

In testimony whereof I affix my signature in presence of two witnesses.

LOUIS K. BENEDICT.

Witnesses:
CHRISTOPHER STANTON,
RALPH K. TOVEL.

Copies of this patent may be obtained for five cents each, by addressing the "Commissioner of Patents, Washington, D. C."